(No Model.)

S. COX, Sr.
LUBRICATOR.

No. 303,420. Patented Aug. 12, 1884.

WITNESSES:
A. P. Grant
W. F. Kircher

INVENTOR:
Stephen Cox, Sr.
BY John A. Wiedersheim
ATTORNEY.

UNITED STATES PATENT OFFICE.

STEPHEN COX, SR., OF BRIDGETON, NEW JERSEY.

LUBRICATOR.

SPECIFICATION forming part of Letters Patent No. 303,420, dated August 12, 1884.

Application filed March 26, 1884. (No model.)

*To all whom it may concern:*

Be it known that I, STEPHEN COX, Sr., a citizen of the United States, residing in Bridgeton, county of Cumberland, State of New Jersey, have invented a new and useful Improvement in Lubricators, which improvement is fully set forth in the following specification and accompanying drawings, in which—

Figure 1:
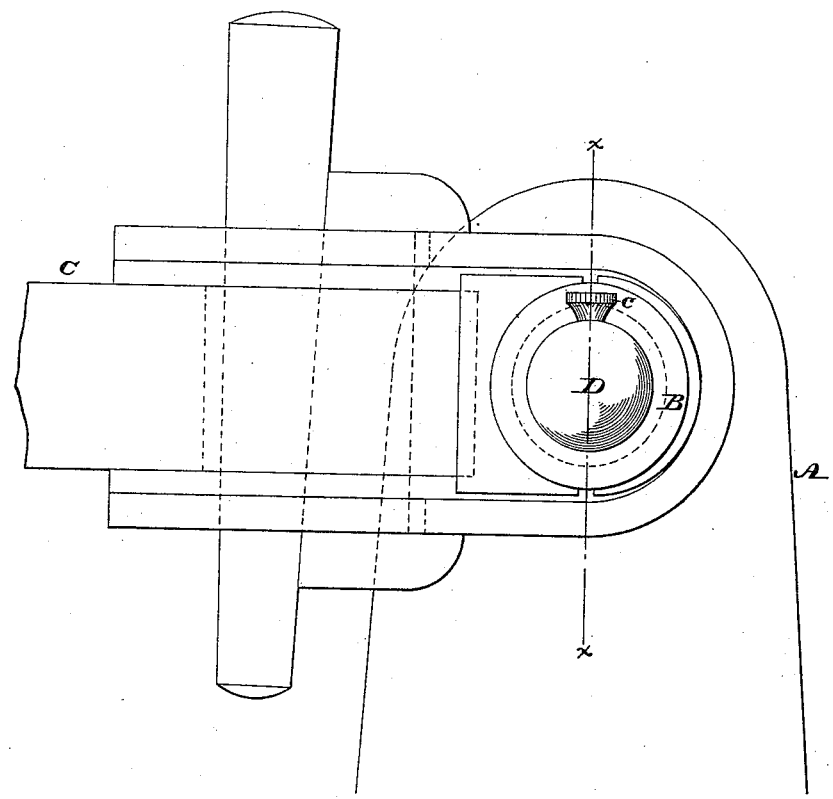
Figure 2:
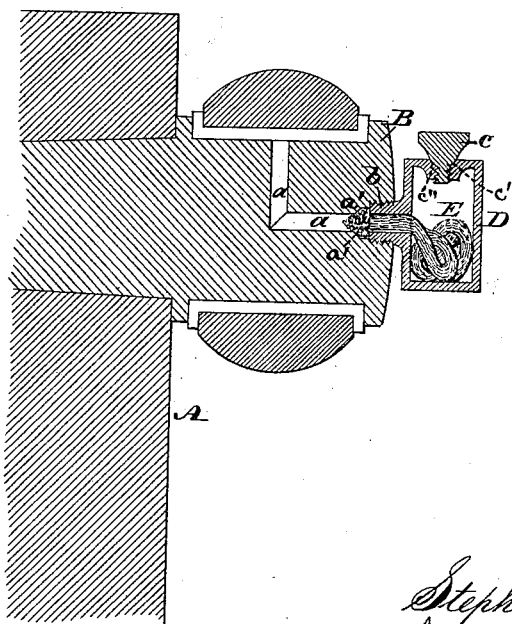

Figure 1 is a side elevation of a lubricator embodying my invention. Fig. 2 is a section thereof in line $x$ $x$, Fig. 1.

Similar letters of reference indicate corresponding parts in the two figures.

My invention consists of a lubricator attached to a crank or wrist-pin or other removable member of an engine or machine, the body of the lubricator having wicking, which is prevented from being drawn or forced through the pin by means of a shoulder on the latter.

It also consists of a screw-plug having a valve-seat to close the box and prevent escape of the lubricant.

Referring to the drawings, A represents a crank, B a crank-pin, and C a connecting-rod, said pin having a duct, $a$, which extends horizontally from the outer end, and then radially to the surface with which the brasses or boxes of the connecting-rod are in contact; or said duct may extend diagonally from the end of the pin to the surface thereof.

D represents a lubricator consisting of a box having a neck, $b$, for attachment to the pin B at the outer end of the duct $a$, and an opening for replenishing the box with oil or lubricant, said opening being properly closed by a plug, $c$. Within the box is a wick, E, one end whereof is passed through the bore of the neck $b$ into the duct $a$ of the pin B, it being noticed that said duct is in communication with said bore, as clearly shown in Fig. 2, the neck projecting horizontally outwardly from the side of the box, and being preferably threaded so as to engage with threads on the walls of the outer end of the duct $a$, thus conveniently and securely connecting the lubricator with the pin B. It will be seen that when the box is properly supplied with lubricant the wick is saturated thereby and conveys the same by capillary attraction to the duct $a$. When the crank is rotated, the pin B follows the motion thereof, and the lubricant is directed through the duct, either by centrifugal action or overturning of the pin, to the surface of the pin, thus lubricating the contact-faces of the pin and boxes or brasses.

Among the advantages of the invention are the gradual and constant lubrication of the parts; as sufficient lubricant or oil only is used to effect this, a saving in the quantity of oil; cleanliness, as slopping and throwing of oil from the movable parts is prevented by the gradual flow, and the prevention of heating of the journals for which the lubricator is employed, due to the constant feed of the oil to the portions of the journals requiring lubrication.

In order to prevent the wick working through the duct $a$ and thus leaving the box, the duct has a shoulder, $a'$, adjacent to the inner end of the neck $b$, against which the expanded end of the wick abuts. The head of the plug $c$ has an inclined side, $c'$, and the opening in the box has an inclined side, $c''$, forming a seat for said plug above the threaded lower portion of the opening in the box, so that the plug becomes a valve, which is tightly closed by screwing it to the box.

Having thus described my invention, what I claim as new, and desire to secure by Letters Patent, is—

1. A box having a neck extending horizontally from the side thereof, and containing wick, in combination with a crank-pin or other movable member of an engine or machine, formed with a duct which is in communication with the bore of the neck of the box, said duct having a shoulder, $a'$, the end of the wick passing through said bore and abutting against said shoulder, substantially as and for the purpose set forth.

2. A lubricator consisting of a box formed with a neck in the side thereof, and a plug which is formed with a screw end, and having a head with an inclined side, the box having an opening which is partly threaded and partly inclined, forming a valve-seat, and screw-connection for said plug, as described.

STEPHEN COX, SR.

Witnesses:
I. BOYD NIXON,
JNO. T. COX.